US011263460B1

(12) United States Patent
Rattner et al.

(10) Patent No.: US 11,263,460 B1
(45) Date of Patent: Mar. 1, 2022

(54) SCHEMA TRANSLATION SYSTEMS AND METHODS

(71) Applicant: YEMBO, INC., San Diego, CA (US)

(72) Inventors: Zachary David Rattner, San Diego, CA (US); Tiana Marie Hayden, San Diego, CA (US); Noel Marie Murphy Kennebeck, San Diego, CA (US)

(73) Assignee: YEMBO, INC., San Diego, CA (US)

( * ) Notice: Subject to any disclaimer, the term of this patent is extended or adjusted under 35 U.S.C. 154(b) by 0 days.

(21) Appl. No.: 17/115,579

(22) Filed: Dec. 8, 2020

(51) Int. Cl.
*G06K 9/00* (2006.01)
*G06N 3/04* (2006.01)
*H04N 7/18* (2006.01)
*H04N 5/272* (2006.01)

(52) U.S. Cl.
CPC ..... *G06K 9/00718* (2013.01); *G06K 9/00765* (2013.01); *G06N 3/0445* (2013.01); *G06N 3/0454* (2013.01); *H04N 5/272* (2013.01); *H04N 7/183* (2013.01)

(58) Field of Classification Search
None
See application file for complete search history.

(56) References Cited

U.S. PATENT DOCUMENTS

2016/0055506 A1\* 2/2016 Tama, Jr .......... G06Q 10/08345
705/7.35
2016/0232498 A1\* 8/2016 Tomlin, Jr ......... G06Q 30/0206

\* cited by examiner

*Primary Examiner* — Heather R Jones
(74) *Attorney, Agent, or Firm* — Pillsbury Winthrop Shaw Pittman LLP

(57) ABSTRACT

Systems, methods, and computer program products are disclosed that include receiving, at a schema translator in communication with a master device, a video feed from a client device. The video feed may be relayed to the master device to allow a substantially simultaneous display of the video feed at the master device. A snapshot from a frame in the video feed may be acquired. An object in the snapshot may be identified during the video feed by a machine learning model and added to a list.

22 Claims, 11 Drawing Sheets

SCHEMA TRANSLATION SYSTEMS AND METHODS

DESCRIPTION OF THE RELATED ART

Providing home services can include making determinations of the scope of work for estimating costs or planning resources required. Oftentimes, this requires a person to physically visit the home and perform a visual assessment as it relates to the services to be provided. Many times, the person making the consultation is not sufficiently skilled (i.e., will not be the person doing the actual work) and as such, repeated consultations may be needed for clarification or to fix mistakes.

SUMMARY

Systems, methods, and computer program products are disclosed that include receiving, at a schema translator in communication with a master device configured to be controlled by a master user, a video feed from a client device configured to be controlled by a client user. The video feed may be relayed to the master device to allow a substantially simultaneous display of the video feed at the master device. A snapshot from a frame in the video feed may be acquired. An object in the snapshot may be identified during the video feed by a machine learning model and added to a list.

In some variations, the machine learning model can determine an attribute of the object and assign the attribute to the item.

In some variations, the attribute can be edited based on input received at the schema translator from the master device or from the client device and the list can be updated based on the edited attribute.

In some variations, the snapshot may be transmitted to the client device for display to the client user. Also, one or more graphical representations associated with the item as obtained from the list can be added to the displayed snapshot. The graphical representations displayed at the client device can be updated in real-time and based on input received at the master device by the master user.

In some variations, a master display can be generated for display at the master device and a client display can be generated for display at the client device. Monitoring can occur for user input by the master user that changes the list and the list can be updated based on changes made by the master user. The master display and/or the client display can be updated based on the updated list.

In some variations, the machine learning model can determine, based on identification of the item, one or more additional items or one or more attributes of the one or more additional items and update the list based on the one or more additional items or the one or more attributes.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also contemplated that may include one or more processors and one or more memories coupled to the one or more processors. A memory, which can include a computer-readable storage medium, may include, encode, store, or the like, one or more programs that cause one or more processors to perform one or more of the operations described herein. Computer implemented methods consistent with one or more implementations of the current subject matter can be implemented by one or more data processors residing in a single computing system or across multiple computing systems. Such multiple computing systems can be connected and can exchange data and/or commands or other instructions or the like via one or more connections, including but not limited to a connection over a network (e.g., the internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to particular implementations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

The manual entry of information relating to a task (e.g., entering data into a computer system) can be tedious and imprecise. The disclosed systems and methods automate the generation and entry of information relevant to a task without requiring user input. The automation enabled by the present disclosure utilizes machine vision and object detection from video or single images. With a trained machine learning model, attributes of the detected objects can be automatically determined and populated as data into a schema that relates to the task. As used herein, the term "schema" refers to information needed to define or execute a task.

In one practical application, such as relocation, a schema can include a list of items to be moved and various attributes of those items such as volume, weight, etc. Because different users (e.g., the client and professionals moving them) may need different information to complete the task, the schema for each may be different. In the relocation example, the professional performing the move may need detailed information about the volume and weight of various items. In contrast, the client being moved may not need (or have) this information and instead their schema may merely be a listing of items to be moved. To accelerate the population of electronic records (e.g., a list), a trained machine learning model can determine various attributes (e.g., volume, weight, etc.) of items identified via the aforementioned machine vision. This can occur in real-time, such as during a consultation videoconference, with the system automatically entering the detected items and their attributes to the moving professional's schema. To facilitate efficient communication between the moving professional and the client, a simplified schema may be displayed to the client. While one exemplary application of the present disclosure is relocation, the underlying technology can be applied in other applications.

Figure 1A:
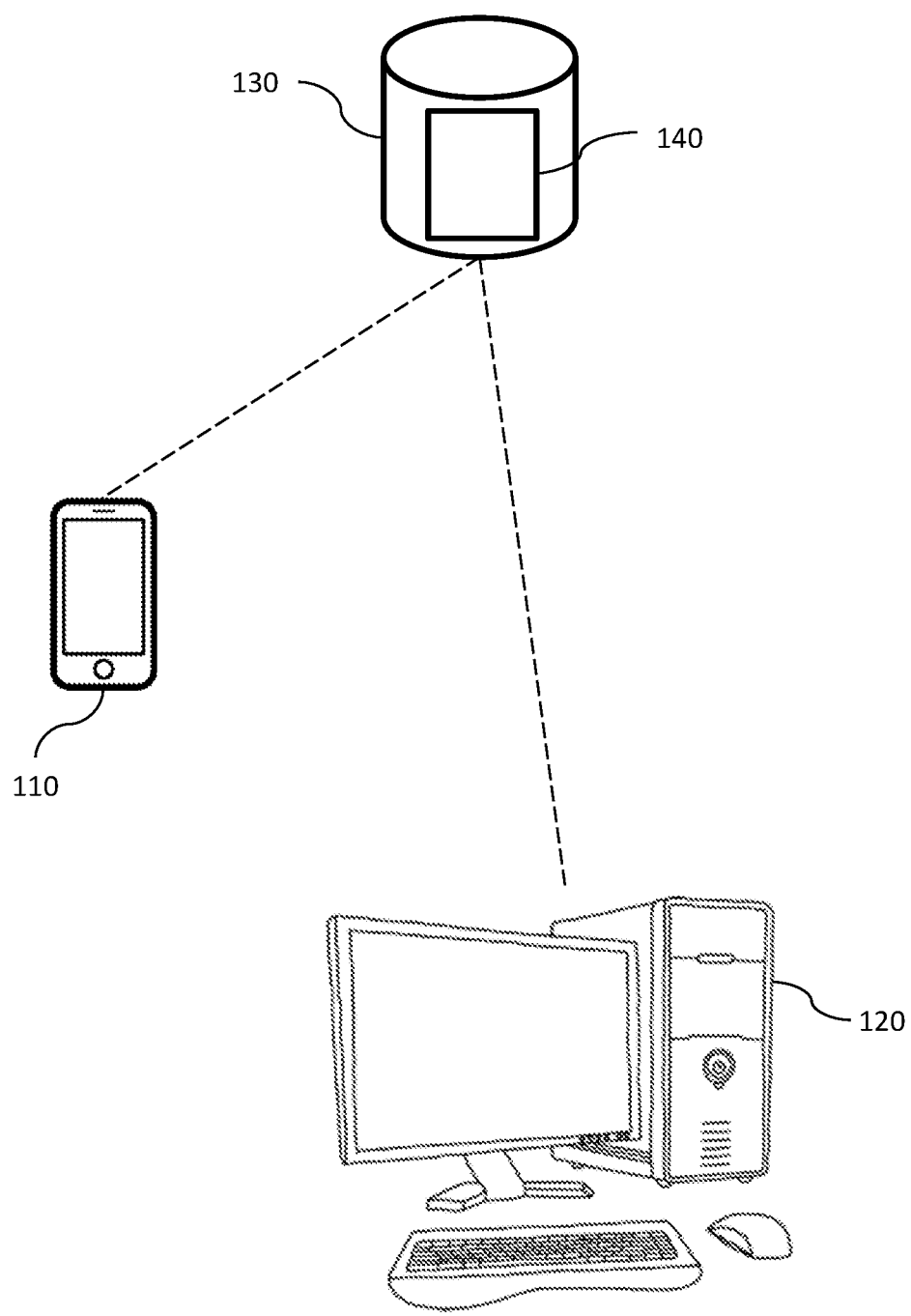
FIG. 1A is a diagram illustrating an exemplary system routing a video feed through a server in accordance with certain aspects of the present disclosure.

FIG. 1A is a diagram illustrating an exemplary system routing a video feed through a server. Some implementations discussed herein can incorporate the use of real-time video (also referred to as videoconferencing, video chat, or a video feed) between a client device 110 and master device 120. Additionally or alternatively, the mode of communication can be the transmission of individual image frames or pictures from the client device and/or master device.

As used herein, a client device can be, e.g., smartphone, tablet, etc. or any device that has a video-taking and transmission capability. A client device can also include devices that only take still images such as digital cameras, a single image acquisition via a smartphone camera, etc. While in general the client device is typically mobile such that it can be used by a client to acquire video or still images in multiple locations, any device that has such capabilities can be considered the client device.

As used herein, a master device can be, for example, a smartphone, tablet, personal computer, etc. Accordingly, the master device may be a workstation or other possibly less mobile computing system utilized by a person at a place of business when communicating with the client.

As used herein, the term "video feed" contemplates video acquired with a camera or other similar device and sent to another device. However, the term as used herein also includes the acquisition and transmission of still images which may be frames in the video feed or may be individual pictures taken (e.g., a photo mode of a smart phone or digital camera). It is also understood that a video feed may include sound data as part of the video stream. In other implementations, video and audio stream may be bifurcated such that the video feed goes to a device (e.g., a server or the master device) while audio is carried separately over conventional telecommunication modes. Accordingly, as used herein, the term "video feed" can include video, still images, and audio, in any combination.

Also shown in FIG. 1A is server 130 where the computer program (herein referred to as the "schema translator" 140) utilizing the images (as described in further detail herein) may be running. In implementations where some or all of the video feed (or images derived therefrom) are generated by the client device, such can be relayed or transmitted to the master device for concurrent display. While it is contemplated that such concurrent video display is substantially simultaneous, in some implementations there may be either intentional (or unintentional) delay or lag in the system such that image generation of the client device and the resultant display at the master device are not substantially simultaneous. As such, some embodiments can include communication modes where the video or images are acquired at the client device and either have a significant delay or are even transmitted after cessation of image/video acquisition. While such embodiments may lack the benefit of two-way real-time communication between the client user (the person controlling the client device) and master user (the person controlling the client device), many implementations consistent with present disclosure can still be utilized.

As described further herein, the schema translator can serve as the backend operator for a schema displayed at the client device and same (or different) schema displayed at the master device. The schema translator can have the outward-facing schemas be browser-based. For example, a client user can use a browser at the client device and go to the appropriate website in communication with the schema translator and a corresponding schema can be displayed at the client device. Similarly, the master user can use a browser at the master device and go to a website (or an internal dedicated program) also in communication with the schema translator such that a schema for the master device can be displayed.

In some embodiments, the client and/or master users can use native applications at their respective devices rather than browser-based applications. For example, the master user could be in a native Windows application, and the client user is on a web browser. As another alternative, the client user could be in an iOS app, and the master user is on a web browser. As another alternative, both can be on native applications or in web browsers.

As used herein, when reference is made to a "schema" that is realized in a graphical display, this means that the information in the schema (e.g. lists, attributes of objects in such lists, etc.) is generated for display in an appropriate graphical user interface. The particulars of the display can vary and all such designs and additional functionality that may be present are considered within the scope of the present disclosure.

Figure 1B:
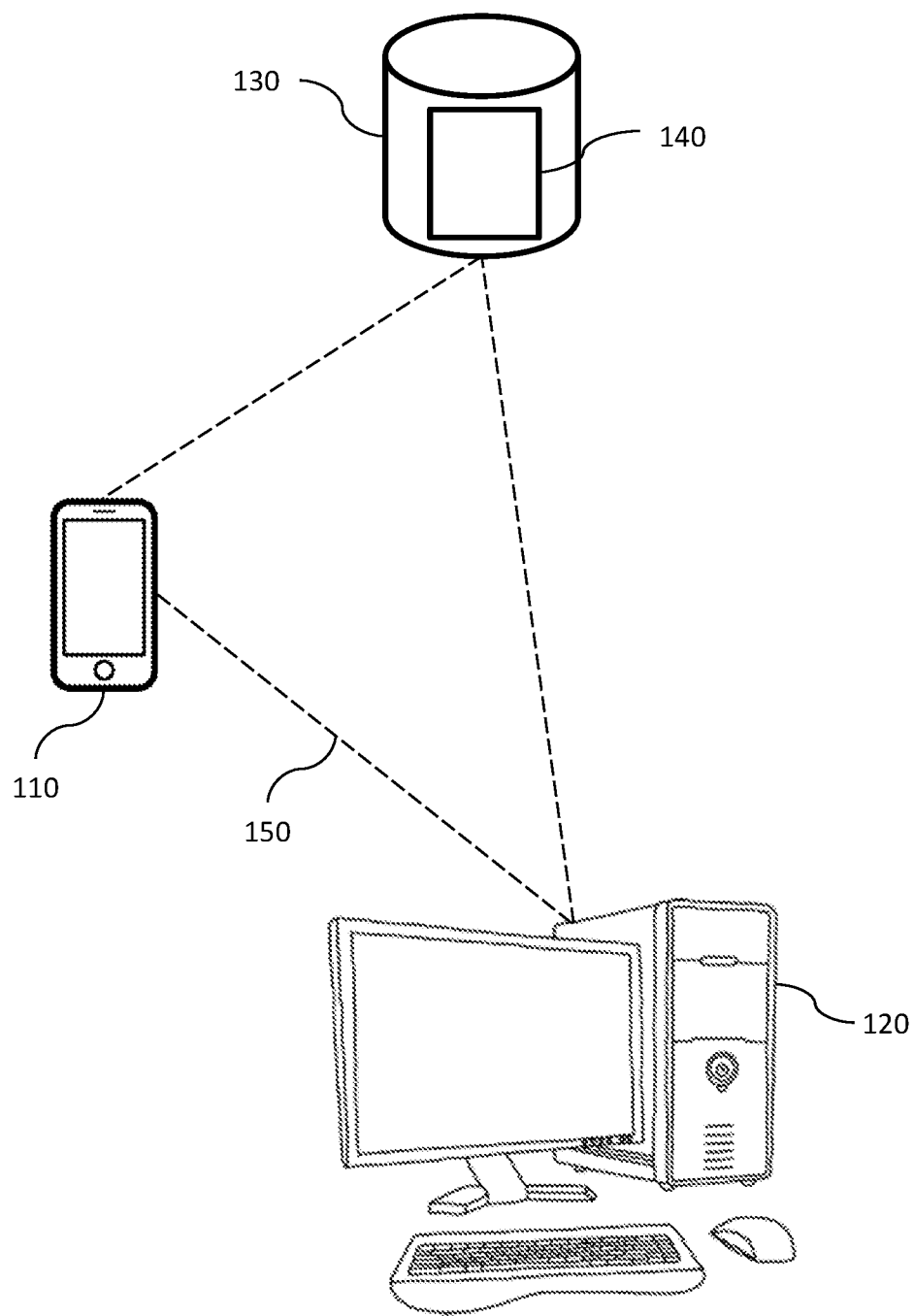
FIG. 1B is a diagram illustrating an exemplary system implementing peer-to-peer transmission of a video feed in accordance with certain aspects of the present disclosure.

FIG. 1B is a diagram illustrating an exemplary system implementing peer-to-peer transmission of a video feed. A peer-to-peer (P2P) connection 150 can be established between the client device and the master device for direct transmission of the video feed (i.e., not requiring that it be transmitted via server 130). Protocols that may be used include STUN, TURN, and ICE, among others. In this way, the video feed may be similar to, or utilize, video chat capabilities of other applications. The video feed can be concurrently transmitted to the server and schema translator or processing as described herein. Alternatively, the video feed (in a streaming sense) may only be between the client device and the master device, but snapshots (as described further below) can be transmitted to the schema translator. Instructions from the schema translator based on the processed video feed or snapshots can then be separately transmitted to the client device and the master device for display. In most other respects, this implementation is similar to that described above with regard to FIG. 1A.

Figure 2A:
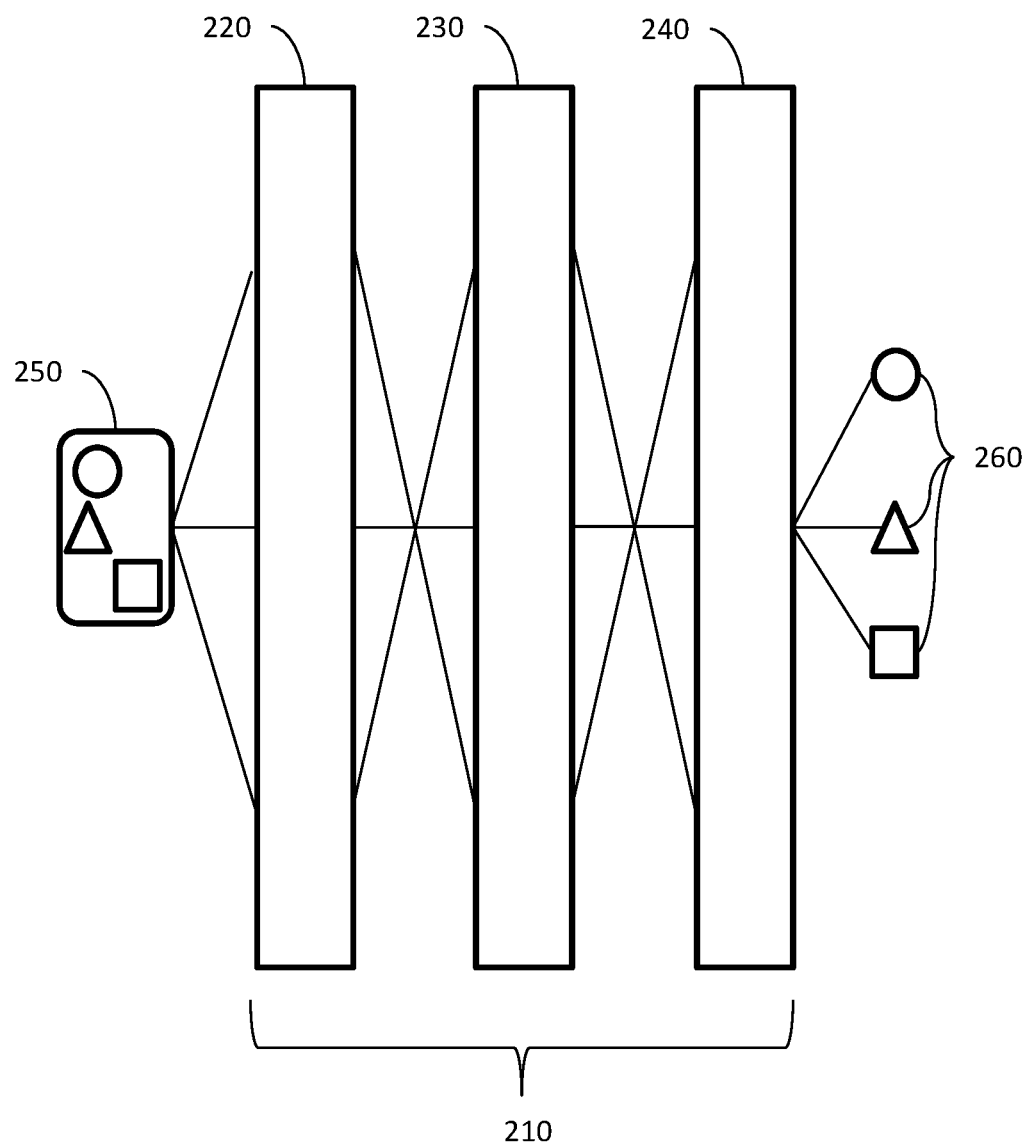
FIG. 2A is a diagram illustrating a simplified machine learning model utilized for item identification and attribute determination in accordance with certain aspects of the present disclosure.

FIG. 2A is a diagram illustrating a simplified machine learning model 210 utilized for object identification and attribute determination. As shown in FIG. 2A, and described in further detail below, one implementation of the machine learning model can include multiple layers such as input layer 220, hidden layer 230, and output layer 240. The machine learning model can receive as input image 250 having various objects in the image. By analyzing regions of the image, the machine learning model can detect and/or classify objects 260.

An AI algorithm (herein also referred to as a machine learning model (ML)) can be implemented for detection or segmentation of an object and/or assignment of attributes to such objects. A deep neural network comprising a convolutional neural network and/or a recurrent neural network can be used to detect or segment objects or areas of interest in images provided to it. For example, individual images in a video may be presented as an input to a convolutional neural network that performs detection or segmentation for objects. Other AI algorithms such as linear regression, random forests, support vector machines, template matching, filtering and thresholding, graph cuts, markov random fields (MRF) etc. may also be used. Multiple different AI algorithms may be used to process one or more different inputs. As an example, besides object detection or segmentation using a convolutional neural network, another different convolutional neural network may be used to classify a location of the user to be a type of a room such as a bedroom, kitchen, etc. As another example, the unit of data such as an image frame may be first processed by an AI algorithm, such as a Convolutional Neural network, and the output of this network may be further processed by another algorithm such as a Recurrent Neural Network. The output of these algorithms can include a 2D and/or 3D bounding box, and/or a mask around the objects of interest, or, for audio data, a text string that processes and translates the user voice input, etc. Similarly, the output of these networks can also include confidence values for the predictions, and the ordered set of classes (different types of objects) that the detected object can be classified to.

As an example of details of the computational structure of such a machine learning model, a neural network (e.g., convolutional and/or recurrent) may be based on a large collection of neural units (or artificial neurons). The one or more neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In an embodiment, each individual neural unit may have a summation function that combines the values of all of its inputs together. In an embodiment, each connection (or the neural unit itself) may have a threshold function such that a signal must surpass the threshold before it is allowed to propagate to other neural units. These neural network systems may be self-learning and trained, rather than explicitly programmed, and can perform significantly better in certain areas of problem solving, as compared to traditional computer programs. In an embodiment, the one or more neural networks may include multiple layers (e.g., where a signal path traverses from front layers to back layers). In an embodiment, back propagation techniques may be utilized by the neural networks, where forward stimulation is used to reset weights on the "front" neural units. In an embodiment, stimulation and inhibition for the one or more neural networks may be freer flowing, with connections interacting in a more chaotic and complex fashion. In an embodiment, the intermediate layers of the one or more neural networks include one or more convolutional layers, one or more recurrent layers, and/or other layers.

The one or more neural networks may be trained (i.e., whose parameters are determined) using a set of training data. The training data may include a set of training samples. Each sample may be a pair comprising an input object (typically a vector, which may be called a feature vector) and a desired output value (also called the supervisory signal). As described above, training inputs may be images, for example. A training algorithm analyzes the training data and adjusts the behavior of the neural network by adjusting the parameters (e.g., weights of one or more layers) of the neural network based on the training data. For example, given a set of N training samples of the form $\{(x\_1,y\_1), (x\_2,y\_2), \ldots, (x\_N,y\_N)\}$ such that $x\_i$ is the feature vector of the i-th example and $y\_i$ is its supervisory signal, a training algorithm seeks a neural network $g:X?Y$, where $X$ is the input space and $Y$ is the output space. A feature vector is an n-dimensional vector of numerical features that represent some object (e.g., an image of a room with objects to be moved as in the example above). The vector space associated with these vectors can be called the feature space. After training, the neural network may be used for making predictions using new samples (e.g., images of different rooms).

Figure 2B:
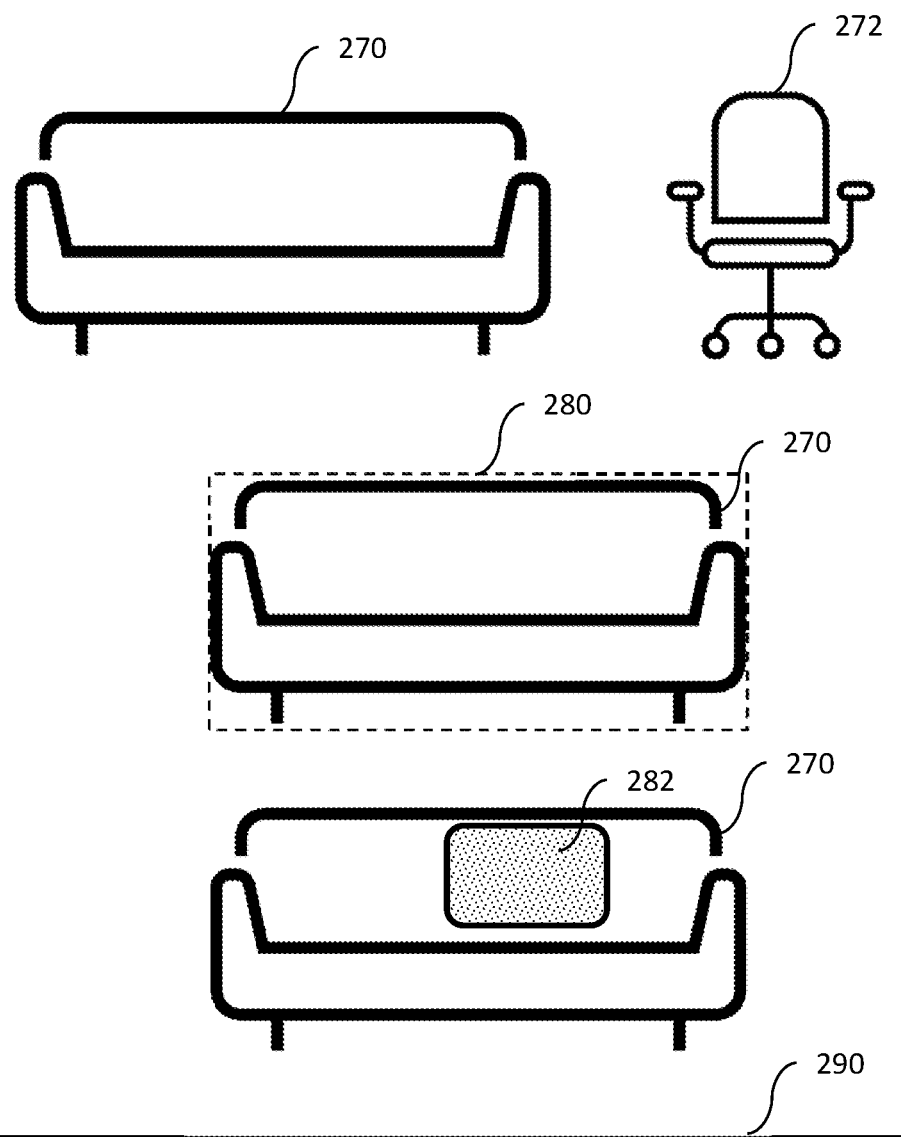
FIG. 2B is a diagram illustrating attribute determination of identified objects in accordance with certain aspects of the present disclosure.

FIG. 2B is a diagram illustrating attribute determination of identified objects. The machine learning model can determine a number of attributes of the detected objects. The objects detected in a given image can have various attributes including, for example, an object identification (e.g., what it is), a dimension (e.g. length, width, height, etc.), a size (e.g., small, medium, large), a volume, a weight, etc. For determining the object identification, the machine learning model may be trained using a library of different objects with known classifications, thus allowing the machine learning model to predict what type of object is depicted in a given image or portion thereof. As to determining a dimension, the machine learning model can rely on a specific detection to determine dimensions of the object. For example, if the machine learning model is able to determine an exact type of couch, then, based on accessing a data store, the dimensions of the couch can be recalled and assigned as attributes. A regression algorithm can be further applied on the data store to fine tune the estimated dimension. In another embodiment, the machine learning model can implement location data (such as GPS data) or stereoscopic features, or other sensors such as infrared or laser sensors of some camera devices in order to determine actual distances in acquired images. Another machine learning model can be used to predict the distances from an RGB image based on a training data that consists of RGB image and distance input for that image on a per pixel basis. Knowing these distances, dimensions of various objects can be determined using several approaches such as using the mathematics of perspective projection and assigned as attributes. Similar to classification, the "size" of an object can be based on the specificity of the classification. For example, if the machine learning model is able to determine a very specific model of couch, which may come in different sizes, then a size label can be applied as an attribute. In another embodiment, the size attribute can be based on a dimension (e.g. a small object may be anything with a maximum dimension of less than 1 foot). In some implementations, during training, items with similar volumes/weights can be combined and assigned a label to that category so the machine learning model can discern it versus other items of different sizes. One example of this is with beds. By grouping king, queen, double, twin beds and training as separate categories, the machine learning model can discern the difference between sizes of beds without needing to determine a "brand" in order to do so.

Also similarly, other attributes such as weight can be determined based on an object's classification (e.g., classifying the object exactly can permit a simple lookup of the object's weight from a data library). In other implementations, the weight of an object can be estimated by the machine learning model based on a general classification (e.g. couch) and one or more dimensions. For example, the machine learning model may have during its training been provided with couches of different sizes and their associated weights. Accordingly, the machine learning model can determine with reasonable confidence the estimated weight of a couch of a particular size. In other implementations, a machine learning model can further classify the item of a specific type (for e.g. metal chair versus plastic chair) and such inferences can be used to determine weights.

As one specific example, FIG. 2B depicts the detection and classification of a couch and associated attributes that can be determined. The top inset in the figure illustrates how the shape of an object as represented images (e.g., via edge detection or other pixel analysis techniques) can be used to readily discriminate between different objects. The trained machine learning model can predict with high confidence what type (or classification) applies to a given object. For example, there is a clear difference in image between a couch 270 and a chair 272, as shown in FIG. 2B.

Once such a classification is made (or as part of making a classification) a bounding box 280 can be established around the item that defines its extents in one or more dimensions. In some cases, the bounding box can be established prior to classification (e.g., by a user) and aid in object detection. The bounding box 280 could further be an object mask to tightly fit the object. For example, it would be very likely that if a couch was misidentified as being a chair that the confidence value of such a determination would be very low due to the fact that chairs typically do not have lengths such as determined by the bounding box.

In some implementations, the system can include a metadata database. Various attributes can be determined by applying a database of appropriate metadata to the items detected by the machine learning model. For example, the machine learning model can detect that the room has a piano in it, which is distinct from an electronic keyboard (because these two items were trained as separate classes). Then, a database of metadata could be used to look up the attributes for the piano and determine that special equipment is needed to tie the hammers. The metadata database would not have the same attributes for electronic keyboards since those don't have physical hammers. The metadata database could also be built based on previous uses of the product. For example, if most movers mark refrigerators as "not moving", this data could be used to add a rule to default refrigerators to "not moving."

As another example of attribute determination, a similar analysis can perform pattern recognition on some parts of the detected image to determine a material attribute. For example, as shown in the third inset of FIG. 2B, a portion 282 of the image can be viewed and its color, texture, etc. can be compared to various samples in a library. Again, the trained machine learning model can determine a most likely candidate for the material and assign that material to the object's material attribute. In some embodiments, a different (e.g., second) machine learning model (trained to identify materials in images) can be utilized for determination of the material. For example, one machine learning model can be used for object detection and identification. Then, once the objects have been detected and/or identified, the second machine learning model can take the portions of the images inside the bounding boxes generated by the first machine learning model and perform a material classification to establish the material attribute for that object. In some implementations, the secondary machine learning model approach may be used for detecting age/condition (the secondary machine learning model could be trained on scratches, dents, water damage, cracks, etc.).

As shown at the bottom of FIG. 2B, an object can be represented in computer memory by an instantiation (e.g., memory objects, table entries, multidimensional arrays, etc.) having various attributes. For the example above of a couch, the table 290 shown provides examples of attributes that could be assigned automatically to the detected object (or item). As discussed further below, such automatic assignment of attributes can aid in quickly populating relevant data sets needed for the schemas of a client user or a master user, and the schema translator they are utilizing.

As used herein, the term "object" can refer to objects that can readily be moved (e.g. furniture, personal belongings, etc.). However, the term "object" can also include "non-objects" or "structural components" that typically are not movable but can be identified from image data. For example, such "non-objects" or "structural components" can include floors, walls, ceilings, doors, etc.

Somewhat distinct from objects are "items." As used herein, "items" refer to a particular subset of identified objects. For example, from an image of a room, objects such as furniture and doors may be detected. However, the "items" may only be taken as the furniture.

As used herein, the term "machine learning model" can refer to a neural network type of algorithm as described above, but also includes any other programs that may aid in the determination and or use of information output by such learning algorithm as described herein. For example, if a neural network part of the machine learning model identifies an object to be a specific type of couch, then another program can use that information to access a lookup table to merely recall various attributes and assign them to the item. In this way, not every operation described herein requires a learning algorithm and may instead be implemented by more conventional computer operations.

Figure 3:
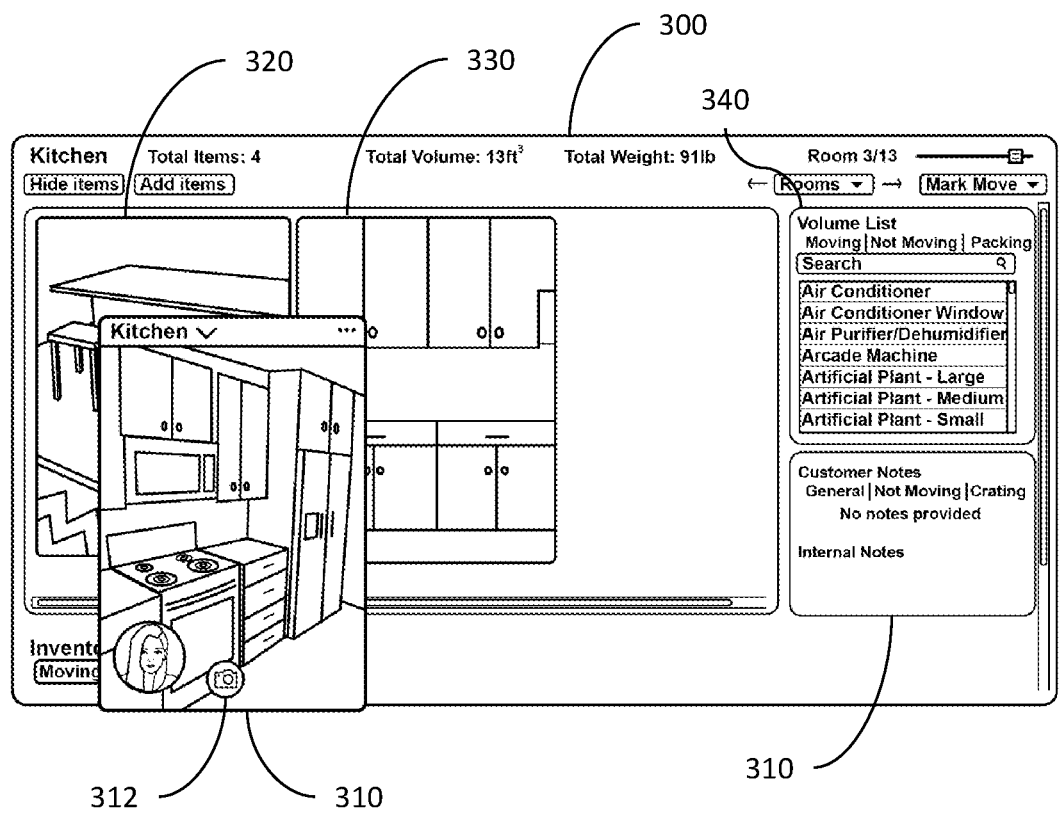
FIG. 3 is a diagram illustrating an exemplary display of snapshots from the video feed as displayed at a master device in accordance with certain aspects of the present disclosure.

FIG. 3 is a diagram illustrating an exemplary display of snapshots from the video feed as displayed at a master device in accordance with certain aspects of the present disclosure. Depicted in FIG. 3 is an exemplary master display 300 generated at graphical user interface of the master device. The master display can include a real-time video display 310 of video taken at the client device. Behind the video display are two examples of single frames acquired from the video feed 320, 330 ("snapshots"). Also shown on the right are examples of objects (accessed via a menu 340) that can be selected by the master user to modify the attributes (e.g., volume) of any of the identified objects, as discussed further herein. Also shown is an exemplary notes area 350 to allow recording of notes associated with the list. As the master user may require more information than the client user, such notes may only be visible at the master device.

The population of the list (which can be any listing of any items and not necessarily an inventory of goods) can be based on the images or video acquired with the client device. To speed processing and reduce data transmission overhead of object detection, some implementations can include extracting a single frame from a video feed or using a single still image such as that acquired as a digital photograph. However, in some implementations, rather than a single frame being used for the snapshot, multiple frames can be used (e.g., via averaging, interpolating, etc.) the data in the frames. Some embodiments may also include analyzing each frame independently and selecting a most likely attribute based on the results (e.g., object detection or attribute determination) over time. For example, if a bed was detected as a queen size bed in 9 out of 10 frames and a king size bed in 1 frame, it is more likely that the bed is queen sized than king and the queen size bed would be used for the object identification and its various attributes.

The FIG. 3 illustration of an exemplary master display at the master device depicts three examples of single frames from the video feed. These snapshots can be acquired during the video feed (e.g., during a video consultation), though in other implementations, can be acquired after the video feed by replaying video file. The acquisition can be based on commands received at the master device. For example, in an implementation, the client device can be held by the client user and move in an environment, acquiring video along the way. The master user, who may be in two-way communication with the client user, may, at the master device, click a button 312 or other input mode at the master display for generation of the snapshot. The snapshot can then be added to a snapshot library which may be stored at the master device and/or on a server. As shown in FIG. 3, snapshots can be added to the master display for reference while the video feed progresses. In other implementations, the schema translator can automatically take snapshots during the video feed, for example, utilizing optical flow techniques or Kalman filtering. This can enable accurately detecting all objects in a particular environment. For example, upon detection of objects that are not in a previously acquired snapshot, additional snapshots can be taken thus developing a comprehensive library of objects included in the video feed.

The automation previously discussed can be implemented by the machine learning model identifying, during the video feed, one or more objects in a snapshot. The identification of objects in the snapshots can be performed in a manner similar to that discussed above—sending the snapshot image to the machine learning model for object detection and attribute determination. As described, the output of the machine learning model can then be imported into the list for populating items and their attributes.

Also, during the video feed, the items can be added to a list based on the identified object. This automatic addition of the items to the list can provide a significant efficiency increase to the process by allowing both the client user and the master user to see the list as it dynamically forms during the video feed (e.g., responsive to the acquisitions of various snapshots). The interface at the master device can also allow for editing of items which may have been already added automatically by the schema translator. For example, the identity of an item can be changed (e.g., accessing a list of items and assigning one to a selected object in a snapshot). In this way, items can be added, removed, or edited/corrected in the list by the master user.

As previously described, the machine learning model can automatically determine attributes for the identified objects. These attributes can then be imported into the list along with the object itself. For example, a detected drawer may, based on analysis of the image data, have a determination made by the machine learning model of the approximate volume of the drawer. This volume can then be assigned to its volume attribute such that the total volume of items in the list are increased by that amount. In the example shown in FIG. 3, the machine learning model has identified a stool, a carpet, and several drawers and cabinets and may be added to the list.

Similar to editing the items themselves, the schema translator can have the capability to allow editing of attributes of selected items based on input received at the schema translator from the master device. For example, an item can be selected from the list of items. The master user can then enter values, select from menus, or any other input method to change the attribute of the selected item, with this data relayed to the schema translator. For example, if the machine learning model assigned a particular size to a refrigerator and that size is known to be incorrect, then the master user could edit the size attribute of the refrigerator to a particular value. In some embodiments, the editing of attributes of selected items can, alternatively or additionally, be based on input received at the schema translator from the client device. In yet other embodiments, the machine learning model can, alternatively or additionally, edit the attributes (e.g., based on changes to other attributes that may affect classification or attribute determination).

The addition/editing of items and/or attributes occurring during the video feed can significantly increase the effectiveness of the video consultation as the master user is capable of receiving feedback from the client user. Such feedback can allow the updating of the list and any object attributes during the consultation rather than requiring separate consultations, or worse, an inaccurate list being generated.

Additionally, the display of snapshots at the master device can include other features that may not be relevant for display at the client device. For example, as seen in FIG. 3, previously acquired snapshots (shown in the background behind the real-time video display) are shown as having bounding boxes that may have been used by the machine learning model to identify the objects. As also seen, the display may include representations of one or more attributes such as the name of the object. In this way, the list stored in computer memory can include any of, for example, the items, their attributes, tags (e.g., moving, not moving, fragile, etc.), or text notes that may be entered by the master user and/or master client via their respective graphical user interfaces.

In some embodiments, the machine learning model can determine based on identification of the item, additional items and, optionally, attributes of the additional item. For example, if the machine learning model was trained to implement a relocation, then if a mattress was identified, this input could result in an output of supplemental items that would be needed for relocation of the mattress, such as a mattress crate, a dolly, etc. Accordingly, the list may be updated based on the one or more additional items or the one or more attributes. These added items may also have attributes associated with them that affect the list. For example, the addition of a mattress crate can change the cumulative volume by that of the mattress crate rather than the volume of the mattress (which volume attribute may be set to zero with this assumption). Also, in this example, the weight attribute would be the sum of mattress and the mattress crate rather than just the mattress crate.

In some implementations, additional functionality can be provided to allow the master user to add items to the list that may not have been detected by the machine learning model. For example, based on input received from the master user at the master device, a bounding box can be generated around a portion of the snapshot. The master user can use various input devices to draw such a bounding box (e.g., mouse, touchscreen, etc.). The bounding box can provide additional information for the machine learning model to identify, by analyzing the portion of the snapshot, an identified object in the bounding box. For example, the missed object may be similar in appearance to the background and thus not distinguished. If a bounding box is selected that includes only (or substantially) the missed item as seen by the human user then the reduced image received by the machine learning model may be able to allow identification of the missed item. The identified object can then be added to the list.

Figure 4:
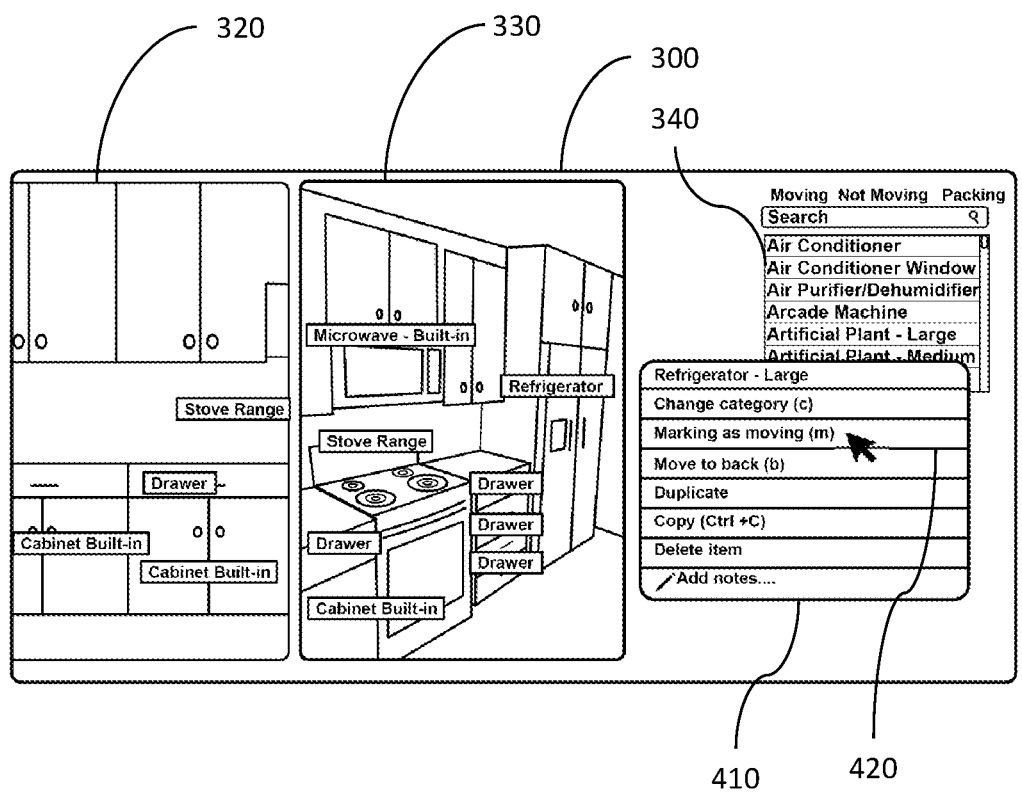
FIG. 4 is a diagram illustrating an exemplary display at a master device depicting updating of attributes in items identified in the snapshots in accordance with certain aspects of the present disclosure.

FIG. 4 is a diagram illustrating an exemplary display at the master device depicting updating of attributes in items identified in the snapshots. The depicted master display is similar to that shown in FIG. 3 but does not include the real-time video display. Items identified in the snapshot can be edited based on input received at the schema translator from the master device. Such editing can include, for example, editing one or more attributes of the item, adding an item (along with any attributes), deleting an item (and/or any of its attributes), etc. One example of such is depicted as the master user utilizing a pop-up menu 410 for the refrigerator identified in the snapshot and presently in the list. As shown, the master user can select a menu item 420 to mark it as being moved (setting an attribute of the item to "moving"). This instruction to change the attribute can then be relayed to the schema translator for updating the master schema (i.e., details of the list that the master user needs) and/or client schema (i.e., the details of the list that the client user is presented with). Such capabilities can allow for dynamic updating of the list based on the edited item. Similarly, such functionality can exist in embodiments where the client device, or the machine learning model, can add/remove/edit the items identified in the snapshot based on input received at the schema translator by any device (e.g., any combination of the master device or client device). The list may then be updated based on the edited item, as described above.

In some implementations, the snapshots acquired by the master device can be transmitted to the client device for display to the client user. For example, the snapshots displayed at the master device can be selected and transmitted as image files to the client device. Optionally, the schema translator can cause one or more graphical representations associated with the item as obtained from the list to be added to the displayed snapshot. In yet other implementations, input can be received at the master device from the master user that causes the graphical representations displayed at the client device to be updated in real-time. For example, the master user can change an attribute about an item in the snapshot. The change can then be relayed to the schema translator which then can cause the display of a corresponding change at the client device. An example of such can be the master user changing the status of an item from "not moving" to "moving." As illustrated later in FIGS. 5A-C, a visual indicator at the client device (e.g., a colored dot on the item indicating whether it is to be moved) can then change color in response to the editing of the attribute. In other implementations, the graphical representation can be an image of the item or an image representative of the item. For example, for a bed that is in the inventory list, the graphical representation can be a picture of the client user's bed from the snapshot or a premade graphic of a generic bed.

Synchronized interactions between the client device and the master device can allow a consistent understanding and verification of the list as it is developed during use. For example, the list can be shared between the master device and the client device such that the graphical displays of both devices show a representation of the list. As described further below, the representation may be the same on both devices but optionally may be different (e.g., simplified at the client device). One implementation to provide such a shared list can include, for example, generating a master display for display at the master device. The master display (e.g., the appearance of the browser window or application running at the master device) can include some or all of the items in the list displayed as entries in a table, a scrolling panel on one side of the master display, or any other mode of graphical display of the list. A similar client display can be generated for display at the client device. As the client device and master device can be in communication with each other via the schema translator, translator can periodically check for (e.g., monitor) user input by the master user that changes the list. Such monitoring can include performing checksums on the local copy of the list at the master device against the current copy of the list at the schema translator. When a difference is detected, the delta between the two lists can be used to update the list at the schema translator based on the changes made by the master user. The checking can be essentially in real-time (e.g., multiple times per second), such as by using UDP connections or TCP with long polling techniques on the client device. In other implementations, the checking can be responsive only to detected user input at the master device (e.g., keyboard entry, mouse scroll, finger scroll, etc.). Accordingly, the master display and/or the client display can be updated based on the updated list.

In general, it is contemplated that the master display may contain information from the list that is not in the client display. As previously mentioned, this functionality can enable the client user to see a simplified version of the list, whereas the master user may see a more detailed version of the list with information the master user needs in order to complete the task. In other implementations, this can be reversed such that the client display may contain information from the list that is not shown on the master display. For example, client display may provide functionality for the client to take notes or annotate selected items in the shared snapshots. These features may be stored locally in memory for client's personal use or may be shared, upon instruction at the client device, with the master device. In some implementations, text notes sent from the client device can be analyzed by the machine learning model to convert the text notes into attributes which can then be applied to a particular item. In yet other implementations, both of the above can be true in that the master display and the client display can both contain information not immediately available to the other.

Similarly, in some implementations, the system can monitor for user input by the client user at the client device where such input changes the list. For example, the user can cause, by interaction with the client display, that an item currently marked as being "moved" should have its appropriate attribute change to "not moved." The list can be updated based on the changes made by the client user. Then, as with other implementations herein, the displays at both devices can then be updated to reflect the client-initiated changes.

In some implementations, to facilitate interaction between the client user and the master user, a master video feed can be generated by a master camera at the master device. The master video feed can be sent to the client device such that the client user and master user can have improved communication. Some implementations can include an inset video of the client user taken by a client-facing camera at the client device, which inset video can be displayed in the master display. Similarly, an inset video of the master user can be taken by a master-facing camera at the master device and can be displayed in the client display.

Figure 5A:
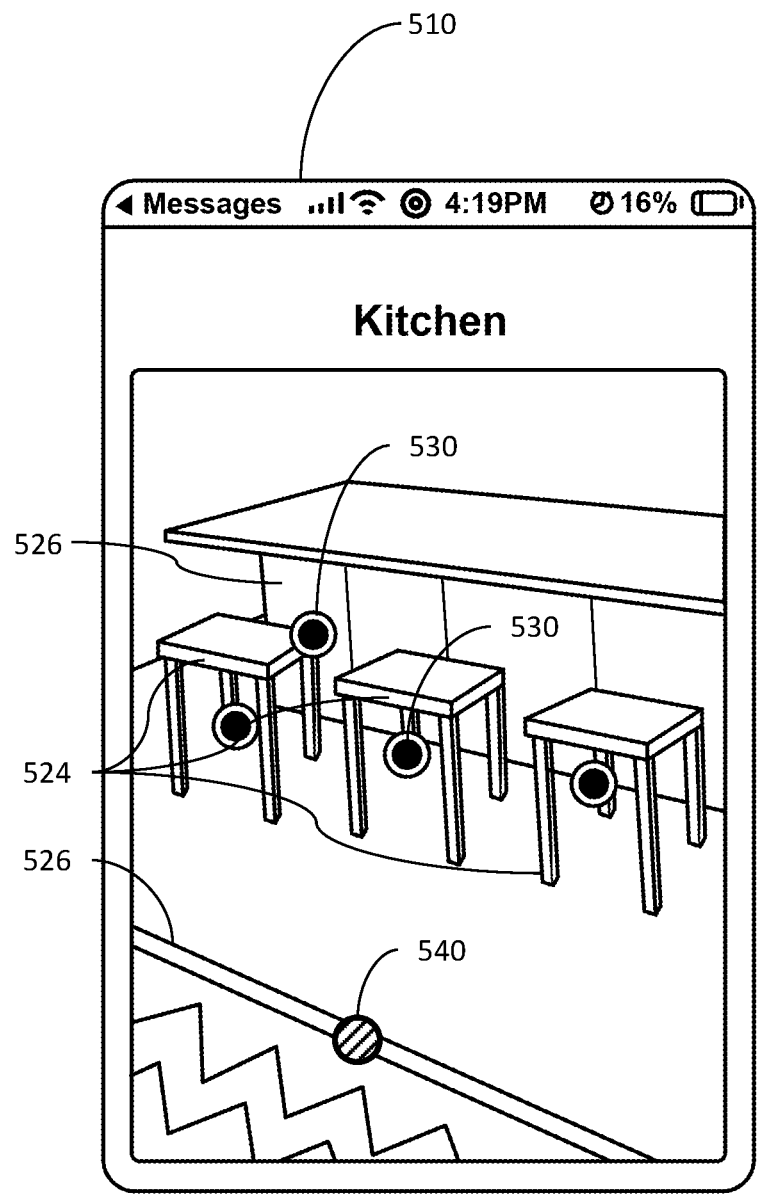
FIG. 5A is a diagram illustrating an exemplary display at a client device depicting attributes in items identified in a first snapshot in accordance with certain aspects of the present disclosure.

FIG. 5A is a diagram illustrating an exemplary display at a client device depicting attributes in items identified in a first snapshot 510 (e.g., as taken from video feed 310). At the client device, a client display can be generated depicting snapshots that were taken by the client device at the instruction of the master device or the client device. In FIG. 5A, several objects 520 have been identified in the depicted snapshot. Specifically, a rug 522, three stools 524, and a cabinet 526. As shown, simplified graphical indications 530 of their attributes may be displayed. For example, the small circles associated with each item can indicate a particular attribute such as moving, not moving, fragile, etc. Such graphical indicia can vary in shape, color, pattern, etc. to communicate to the client user information about the identified items. In the illustrated example, the rug 522 has a different graphical indicia 540 than the other items, indicating that it is "valuable" and that such is an attribute of the item.

Figure 5B:
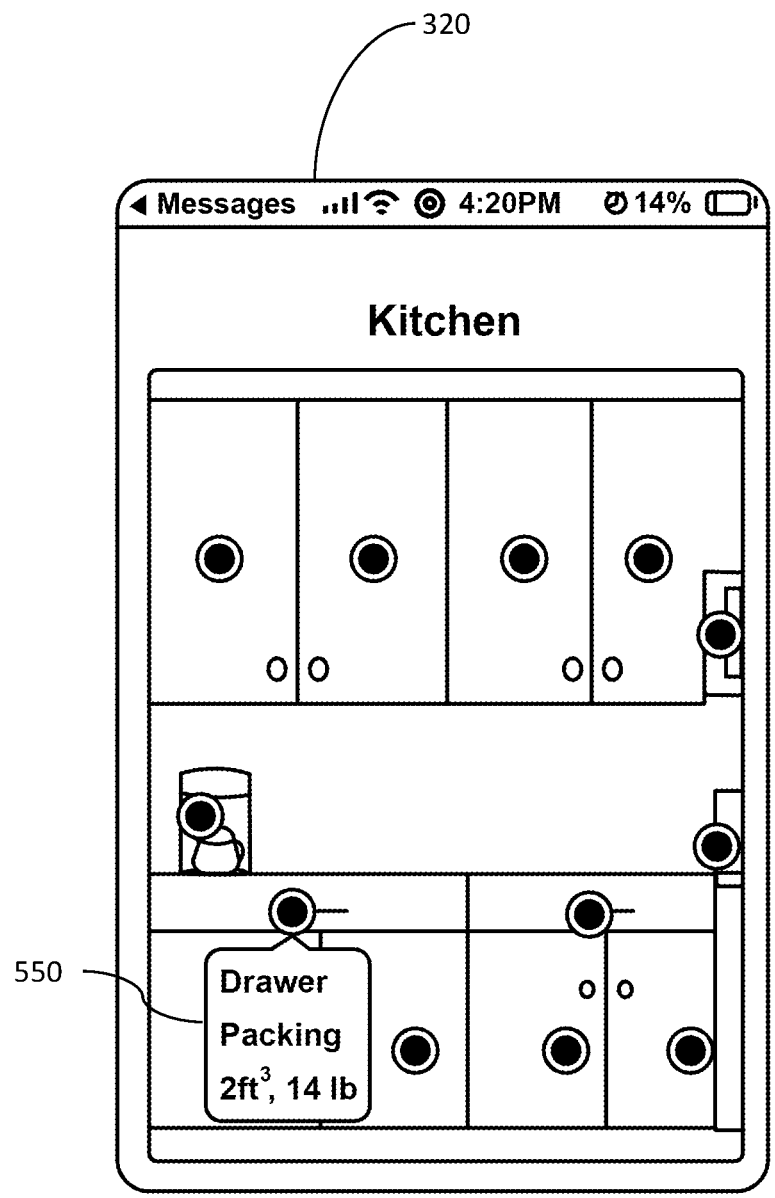
FIG. 5B is a diagram illustrating an exemplary display at a client device depicting attributes in items identified in a second snapshot in accordance with certain aspects of the present disclosure.

FIG. 5B is a diagram illustrating an exemplary display at a client device depicting attributes in items identified in a second snapshot 320. Here, a number of items such as cabinets, drawers, kitchen items, etc. have been identified. As with that shown in FIG. 5A, graphical indications can be included. However, also depicted is an implementation where specific information about the item is displayed in a text format 550. In this case, a drawer is identified by name, its status ("packing"—contents to be packed), it's estimated area and the estimated weight of its contents (as can be estimated by the machine learning model based on the location (kitchen), dimension, and training data of the weight of such items.

Figure 5C:
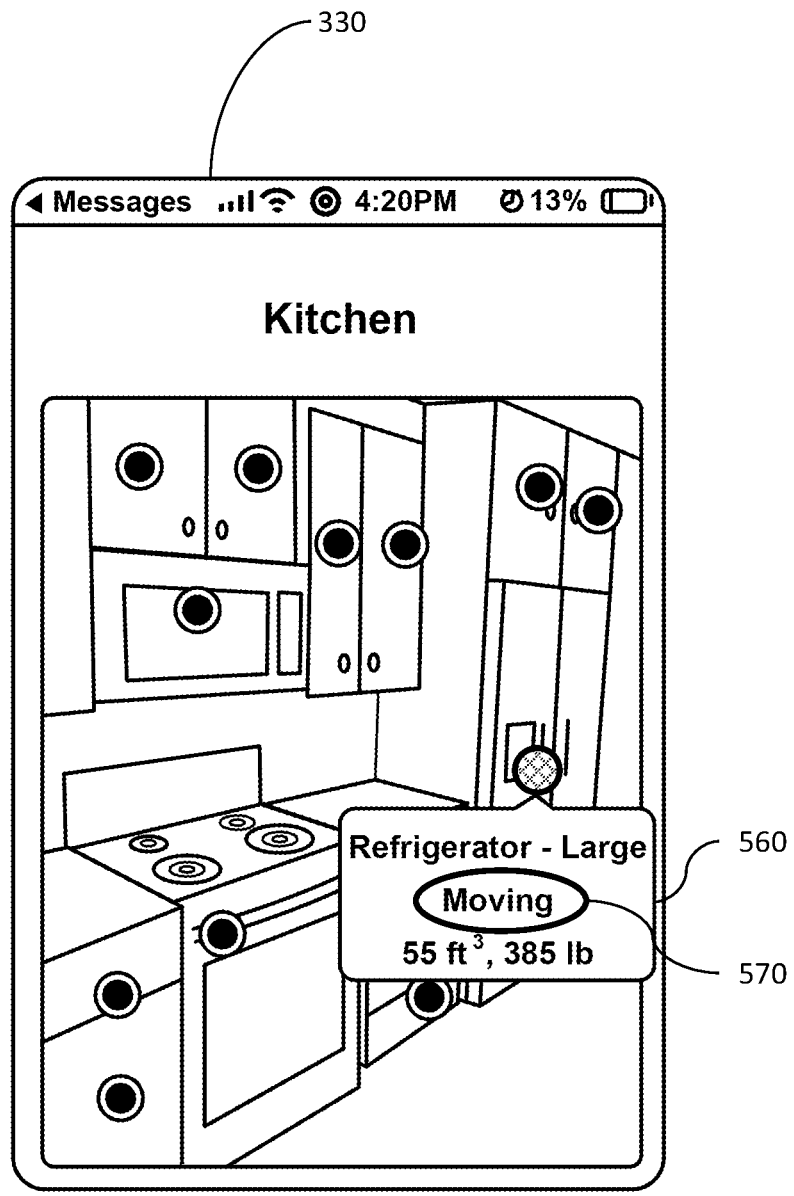
FIG. 5C is a diagram illustrating an exemplary display at a client device depicting attributes in items identified in a third snapshot in accordance with certain aspects of the present disclosure.

FIG. 5C is a diagram illustrating an exemplary display at a client device depicting attributes in items identified in a third snapshot 330. As previously discussed, the master user has the capability to change the attributes of detected items. In the third snapshot, a refrigerator has been detected. However, in this example, the machine learning model may have initially set its "moving/not moving" attribute to "not moving" based on an assessment that such a refrigerator typically does not move in a relocation. However, upon receiving feedback from the client user, the master user can interact with master display (as shown in FIG. 4) to cause the respective attribute of the refrigerator item to change to "moving." This update can be reflected in the graphical indication 560 concurrently displayed at the client device showing the updated attribute 570, allowing the client user to confirm the change. Also shown in the graphical indication 560 are other attributes: size, volume, and weight.

Figure 6:
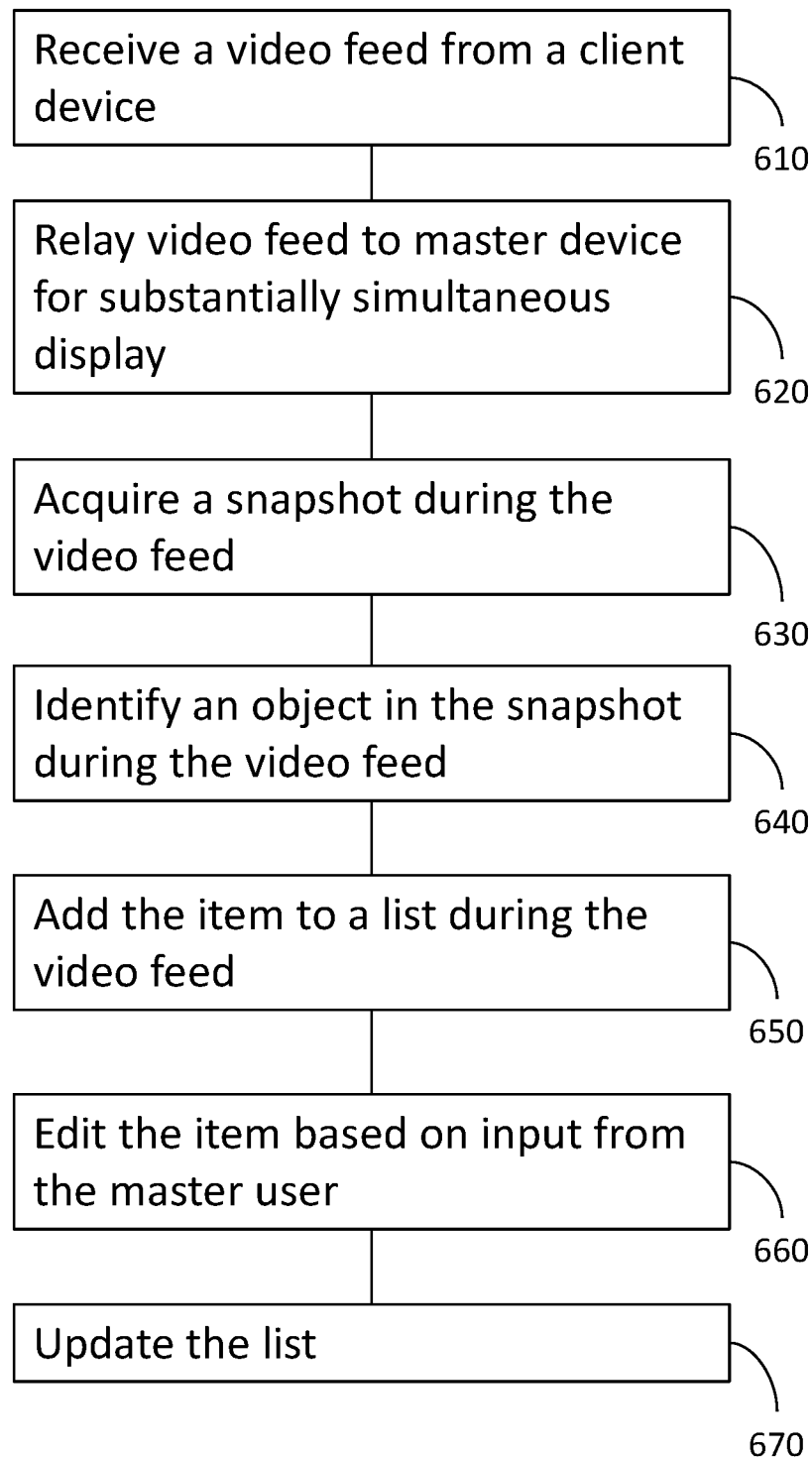
FIG. 6 is a diagram illustrating an exemplary method in accordance with certain aspects of the present disclosure.

FIG. 6 is a diagram illustrating an exemplary method in accordance with certain aspects of the present disclosure. In one implementation, a method can include, at 610, receiving, at a schema translator in communication with a master device configured to be controlled by a master user, a video feed from a client device configured to be controlled by a client user. At 620, the video feed can be relayed to the master device to allow a substantially simultaneous display of the video feed at the master device. At 630, a snapshot can be acquired during the video feed from a frame in the video feed. At 640, the method can include identifying, during the video feed and by a machine learning model, an object in the snapshot. At 650, an item can be added during the video feed to a list based on the object. At 660, the item identified in the snapshot can be edited based on input received from the master user at the schema translator. At 670, the list can be updated based on the edited item.

Figure 7:
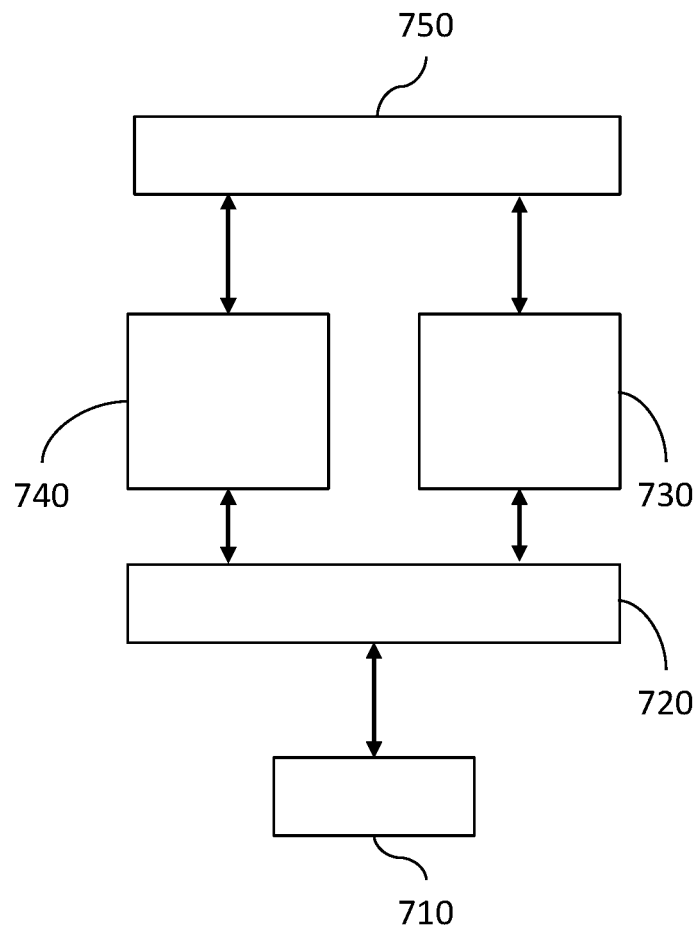
FIG. 7 is a diagram illustrating an exemplary computer architecture for multiple priority queues in accordance with certain aspects of the present disclosure.

FIG. 7 is a diagram illustrating an exemplary computer architecture for multiple priority queues in accordance with certain aspects of the present disclosure. As shown in FIG. 7, some implementations can include the use of multiple cues (e.g., a "medium-priority queue" 730 and a "high-priority queue" 740 to optimize the execution of the disclosed operations herein. For example, a user device (e.g., master device) can upload an image (e.g., a snapshot) or a video segment to the server running machine learning model 750. This can include making an API call to initiate the analysis.

Depending on latency requirements, the API 720 can place the message in either the medium-priority queue or high-priority queue. For implementations without strict timing requirements, the master user may be sent an email when the analysis is ready, so minutes of delay can be tolerable. For example, videos in the medium-priority queue can sometimes take 3-5 minutes to process. Even if there is only one message in the medium-priority queue ahead of a high-priority message, it can sometimes take 5 minutes to process and thus some timing requirements may not be met for the high-priority traffic.

The additional high-priority queue can have the same interface to the machine learning model as the medium-priority queue. But since the media to be analyzed are either individual images or very short videos (less than 10 seconds), media in the high-priority queue generally takes 1-3 seconds to process.

The machine learning model can then process the video/images as described herein, for example returning labeled bounding boxes for each item detected along with the determined attributes. The remainder of the postprocessing (negative class suppression, temporal filtering, etc.) can be handled within the high-priority queue to keep the workload on the object detector identical across the two queues. Such implementations can allow the prioritizing of high-priority traffic without the need for additional hardware such as additional servers to run object detection and analysis operations.

The disclosed computer operations can be utilized for any number of applications. To provide context for the above, such was often discussed in terms of a relocation task. However, in other implementations, any features of the present disclosure can be utilized for underwriting or claim adjustment, remodeling, painting, furnishing, junk removal, etc. The underlying software architecture can remain substantially the same, with application-specific attributes. For example, in a relocation application, identifying a wall in an image may not be relevant. However, the same identification utilizing the same algorithms described above, in a painting application, can cause attributes of the wall to be assigned in a manner similar to the above (e.g., dimensions, square footage, material, etc.).

Accordingly, some implementations can include generating a quote based on at least the list and the attribute(s), where the quote is for moving the object from a location of the object to a destination location. Such a quote can be generated based on a formula that takes into account the identification of the objects, sizes, weights, etc. in addition to other information such as current location and destination of the move and the date of the move.

In one case, the master user could have no items in the list before the time of the consultation. Here, the entire list can be built during the consultation. In another case, the master user could have captured a partial list before the consultation. Here, the consultation can resume with the partial list and build the remaining list. This can be achieved by syncing the updates to the list to permanent storage such as a REST API in addition to broadcasting to other members of the consultation via UDP (User Datagram Protocol). In yet another case, the master user could have captured a complete or near-complete list before the consultation. Here, the consult is used only to review the list together, but not capture any new items.

Real-time streaming is inherently unreliable, so if relying on UDP alone, the master device and client device can get into contradicting states, e.g., the service provider believes the consumer's environment-facing camera is active but the consumer's front-facing camera is actually inactive. This can result in the master user attempting to share the list with the consumer but the consumer may not receive the UDP message. To address this technical problem, when a user on either side of the call has reconnected after dropping, both sides can be reset to a common initial state. Acknowledgment may also be required before shifting to a new state, so for example if the master user flips the client user's camera the master user can send an acknowledgment of the successful camera flip so the client device's application state can enable screenshots—this prevents getting out of sync.

In some implementations, to provide a yet further acceleration of obtaining sufficient information to complete the task (i.e., not getting information that has little to no effect) decision trees can be implemented to prompt the master user to ask targeted questions and receive specific images or information from the client user via the client device. For example, to provide an accurate statement of work for a move, it is not always necessary to catalog every single item in the residence. Accordingly, a decision tree can include queries on the number of rooms, the primary items in, special moving instructions (e.g. whether a particular item is fragile or expensive), etc. The master user can through the decision tree and either obtain information directly from the client user or obtains image data from the client device that permits the machine learning model to determine relevant attributes needed to answer the queries. In this way, following a displayed script at master device that provides prospective questions from the decision tree, the final result (e.g., moving quote, underwriting, etc.) can be rapidly determined.

The present disclosure contemplates additional algorithms which may be used in other applications, underwriting for example, but other applications as well. Similar to the relocation example, the client user can capture a video or images of the contents of their home, and an inventory list is generated alongside a list of images and bounding boxes identifying each item in the images.

The goal of this algorithm is to take the list derived by the process described earlier and determine the RCV, the replacement cost value of the contents of the home. The operations described below need not be implemented in the order presented. The below can also be applied to determine other values, such as an actual cost value.

At a first operation, let "I" be the set of inventory items present. This list can be determined by running the process described herein to build I from video(s) or single frame images. Items $i \in I$ can contain, for example, item name, containing room, quantity. Items may also contain optional metadata (other attributes), which can vary with the object, but can contain any of the following, as examples: material, brand, make/model, condition, or serial number.

At a second operation, f, a baseline cost weighting factor for the overall inventory, can be determined. The value off can be, for example, a number between 0 and 100 that indicates percentile of cost distribution. For example, f=99 means that the baseline should use $99^{th}$ percentile RCV. f can be determined by a database lookup for information such as value of home, square footage, building construction year and type, estimated annual income for the ZIP code, etc.

At a third operation, let r, or the risk adjustment factor be initialized to 1 or other arbitrary initial value.

At a fourth operation, for one or more items $i \in I$, determine $RCV_i$, which is the replacement cost value of item i. The item (name and metadata) can be looked up in a database to retrieve its RCV distribution, for example: $RCV_{i\_10}$: $10^{th}$ percentile RCV, $RCV_{i\_50}$: $50^{th}$ percentile RCV, and $RCV_{i\_90}$: $90^{th}$ percentile RCV. If $RCV_{i\_90}$-$RCV_{i\_10}$=$\Delta RCV<\varepsilon$, then the values are close and let $RCV_i$=$RCV_{i\_50}$. Otherwise, there is substantial variation in cost, so interpolate to let $RCV_i$=$RCV_{i\_f}$, where f is the value determined in (2). If the metadata for i contains risks, increase r by a predetermined amount commensurate with the risk. Set $r=r*(1+r_i)$, where $r_i$ is a positive number predetermined in the database for the risk for item i.

At a fifth operation, the replacement cost value of the inventory I can be determined by summing $RCV_i, \forall i \in I$. Once RCV is determined for the inventory I, it can be used to suggest products that are available.

At a sixth operation, products can be removed that are ineligible for risks present in the metadata for $i \in I$. For example, if certain products are not available for homes with pools that lack perimeter fencing, then such products can be removed so they are not suggested. Such operations can be implemented utilizing the metadata database approach previously discussed by having items annotated to be excluded from the present algorithm.

At a seventh operation, the costs of such products can be scaled for each available policy by r to account for additional risks present.

At an eighth operation, the system can provide available products that provide at least RCV in coverage and cover risks present in the inventory.

In another embodiment, a value assessment of identified items (e.g., damaged items) can be made by incorporating other algorithms in combination with those discussed elsewhere herein.

In a first operation, video or images of a location(s) can be acquired.

In a second operation, the machine learning model can processes the video/images and determine I, the set of items (e.g., sofa, bed, TV, etc.) and structural components (e.g., drywall) or other "non-objects" present in the location(s). Such processing can be performed by the system according to any of the embodiments described herein.

In a third operation, a value C, the initial value of one or more identified items, may be set to zero initially.

In a fourth operation, comprising a number of suboperations, any of which are optional, for one or more items $i \in I$, the system may determine $R_i$, a probability between 0 and 1 (inclusive) that indicates the likelihood that item i is eligible for replacement.

At a first suboperation, the system may initialize $R_i=0$.

At a second suboperation, if the condition metadata for item i contains effects of damage (e.g., mold, mildew, rot), increase $R_i$ by a predetermined about $\Delta R$: Let $R_i = \min(1, R_i + \Delta R)$. $\Delta R$ may be retrieved from a database and is the probability that the item needs to be replaced when damaged. For example, a TV could have a high $\Delta R=0.9$ since it is likely to need to be replaced if it was damaged by water, and a plastic chair could have a lower $\Delta R=0.2$.

At a third suboperation, for example in assessing water damage, if a waterline was not able be to detected in the room (e.g., a line on the drywall showing previous flood levels), the algorithm can skip to the determination of whether the item was present during a prior value assessment. Continuing with a water damage example, if the placement of item i was detected to be below the water line, increase $R_i$ by a predetermined about $\Delta R$: Let $R_i = \min(1, R_i + \Delta R)$. Otherwise, decrease $R_i$ by a predetermined amount $\Delta R$: Let $R_i = \max(0, R_i - \Delta R)$. For example, if the waterline is detected one foot above the floor and a TV is hanging on the wall, it is less likely that the TV was submerged and therefore R should be decreased.

At a fourth suboperation, the system may determine if i was present in the inventory list at the time of underwriting. If so, the system may determine if the condition metadata for item i contained effects of water damage (e.g., mold, mildew, rot) at the time of the prior value assessment. If so, decrease $R_i$ by a predetermined amount $\Delta R$: Let $R_i = \max(0, R_i - \Delta R)$. If the item was not present in the inventory list, decrease $R_i$ by a predetermined amount $\Delta R$: Let $R_i = \max(0, R_i - \Delta R)$.

At a fifth suboperation, if R is greater than some threshold, e.g., 0.8, then set $C = C + RCV_i$.

In a fifth operation, if C is 0, the algorithm can provide output indicating that the value is zero.

At a sixth operation, if C>0, the algorithm can provide output indicating that the value is C.

In the following, further features, characteristics, and exemplary technical solutions of the present disclosure will be described in terms of items that may be optionally claimed in any combination:

Item 1: A method including receiving, at a schema translator in communication with a master device configured to be controlled by a master user, a video feed from a client device configured to be controlled by a client user; relaying the video feed to the master device to allow a substantially simultaneous display of the video feed at the master device; acquiring, during the video feed, a snapshot from a frame in the video feed; identifying, during the video feed and by a machine learning model, an object in the snapshot; and adding, during the video feed, an item to a list based on the object.

Item 2: The method of Item 1, further comprising determining, by the machine learning model, an attribute of the object; and assigning the attribute to the item.

Item 3: The method of any one of the preceding Items, wherein the attribute includes one or more of: an object identification, a dimension, a size, a volume, or a weight.

Item 4: The method of any one of the preceding Items, further comprising editing the attribute based on input received at the schema translator from the master device or from the client device; and updating the list based on the edited attribute.

Item 5: The method of any one of the preceding Items, wherein the snapshot is acquired automatically by the schema translator during the video feed.

Item 6: The method of any one of the preceding Items, further comprising transmitting the snapshot to the client device for display to the client user; adding, to the displayed snapshot, one or more graphical representations associated with the item as obtained from the list; and updating, in real-time and based on input received at the master device by the master user, the graphical representations displayed at the client device.

Item 7: The method of any one of the preceding Items, further comprising generating a master display for display at the master device; generating a client display for display at the client device; monitoring for user input by the master user that changes the list; updating the list based on changes made by the master user; and updating the master display and/or the client display based on the updated list.

Item 8: The method of any one of the preceding Items, wherein the master display contains information from the list that is not in the client display.

Item 9: The method of any one of the preceding Items, further comprising monitoring for user input by the client user that changes the list; and updating the list based on changes made by the client user.

Item 10: The method of any one of the preceding Items, further comprising generating a master video feed by a master camera at the master device; and sending, to the client device, the master video feed.

Item 11: The method of any one of the preceding Items, further comprising determining, by the machine learning model and based on identification of the item, one or more additional items or one or more attributes of the one or more additional items; and updating the list based on the one or more additional items or the one or more attributes.

Item 12: A system comprising: at least one programmable processor; and a non-transitory machine-readable medium storing instructions which, when executed by the at least one programmable processor, cause the at least one programmable processor to perform operations comprising those of any of Items 1-11.

Item 13: A non-transitory machine-readable medium storing instructions which, when executed by at least one programmable processor, cause the at least one programmable processor to perform operations comprising those of any of Items 1-11.

The present disclosure contemplates that the calculations disclosed in the embodiments herein may be performed in a number of ways, applying the same concepts taught herein, and that such calculations are equivalent to the embodiments disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (or "computer readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" (or "computer readable signal") refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and subcombinations of the disclosed features and/or combinations and subcombinations of further features noted above. Furthermore, above described advantages are not intended to limit the application of any issued claims to processes and structures accomplishing any or all of the advantages.

Additionally, section headings shall not limit or characterize the invention(s) set out in any claims that may issue from this disclosure. Further, the description of a technology in the "Background" is not to be construed as an admission that technology is prior art to any invention(s) in this disclosure. Neither is the "Summary" to be considered as a characterization of the invention(s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention(s), and their equivalents, that are protected thereby.

What is claimed is:

1. A computer program product comprising a non-transitory, machine-readable medium storing instructions which, when executed by at least one programmable processor, cause operations in real-time during a consultation video-conference between a master user and a client user, the operations comprising:
receiving, at a schema translator in communication with a master device configured to be controlled by the master user, a video feed from a client device configured to be controlled by the client user;
relaying the video feed to the master device to allow a substantially simultaneous display of the video feed at the master device;
acquiring, during the video feed, a snapshot from a frame in the video feed;
identifying, during the video feed, and by a machine learning model, an object in the snapshot; and
adding, during the video feed, an item to a list based on the object.

2. The computer program product of claim 1, the operations caused in real-time during the consultation videoconference further comprising:
  determining, by the machine learning model, an attribute of the object; and
  assigning the attribute to the item.

3. The computer program product of claim 2, wherein the attribute includes one or more of: an object identification, a dimension, a size, a volume, or a weight.

4. The computer program product of claim 2, the operations caused in real-time during the consultation videoconference further comprising:
  editing the attribute based on input received at the schema translator from the master device or from the client device; and
  updating the list based on the edited attribute.

5. The computer program product of claim 1, wherein the snapshot is acquired automatically by the schema translator during the video feed.

6. The computer program product of claim 1, the operations caused in real-time during the consultation videoconference further comprising:
  transmitting the snapshot to the client device for display to the client user;
  adding, to the displayed snapshot, one or more graphical representations associated with the item as obtained from the list; and
  updating, in real-time and based on input received at the master device by the master user, the one or more graphical representations displayed at the client device.

7. The computer program product of claim 1, the operations caused in real-time during the consultation videoconference further comprising:
  generating a master display for display at the master device;
  generating a client display for display at the client device;
  monitoring for user input by the master user that changes the list;
  updating the list based on changes made by the master user; and
  updating the master display and/or the client display based on the updated list.

8. The computer program product of claim 7, wherein the master display contains information from the list that is not in the client display.

9. The computer program product of claim 7, the operations caused in real-time during the consultation videoconference further comprising:
  monitoring for user input by the client user that changes the list; and
  updating the list based on changes made by the client user.

10. The computer program product of claim 1, the operations caused in real-time during the consultation videoconference further comprising:
  generating a master video feed by a master camera at the master device; and
  sending, to the client device, the master video feed.

11. The computer program product of claim 1, the operations caused in real-time during the consultation videoconference further comprising:
  determining, by the machine learning model and based on identification of the item, one or more additional items or one or more attributes of the one or more additional items; and
  updating the list based on the one or more additional items or the one or more attributes.

12. A system comprising:
  at least one programmable processor; and
  a non-transitory machine-readable medium storing instructions which, when executed by the at least one programmable processor, cause the at least one programmable processor to perform operations in real-time during a consultation videoconference between a master user and a client user, the operations comprising:
    receiving, at a schema translator in communication with a master device configured to be controlled by the master user, a video feed from a client device configured to be controlled by the client user;
    relaying the video feed to the master device to allow a substantially simultaneous display of the video feed at the master device;
    acquiring, during the video feed, a snapshot from a frame in the video feed;
    identifying, during the video feed and by a machine learning model, an object in the snapshot; and
    adding, during the video feed, an item to a list based on the object.

13. The system of claim 12, the operations caused in real-time during the consultation videoconference further comprising:
  determining, by the machine learning model, an attribute of the object; and
  assigning the attribute to the item.

14. The system of claim 13, wherein the attribute includes one or more of: an object identification, a dimension, a size, a volume, or a weight.

15. The system of claim 13, the operations caused in real-time during the consultation videoconference further comprising:
  editing the attribute based on input received at the schema translator from the master device or the client device; and
  updating the list based on the edited attribute.

16. The system of claim 12, wherein the snapshot is acquired automatically by the schema translator during the video feed.

17. The system of claim 12, the operations caused in real-time during the consultation videoconference further comprising:
  transmitting the snapshot to the client device for display to the client user;
  adding, to the displayed snapshot, one or more graphical representations associated with the item as obtained from the list; and
  updating, in real-time and based on input received at the master device by the master user, the one or more graphical representations displayed at the client device.

18. The system of claim 12, the operations caused in real-time during the consultation videoconference further comprising:
  generating a master display for display at the master device;
  generating a client display for display at the client device;
  monitoring for user input by the master user that changes the list;
  updating the list based on changes made by the master user; and
  updating the master display and/or the client display based on the updated list.

19. The system of claim 18, wherein the master display contains information from the list that is not in the client display.

20. The system of claim 18, the operations caused in real-time during the consultation videoconference further comprising:
  monitoring for user input by the client user that changes the list; and
  updating the list based on changes made by the client user.

21. The system of claim 12, the operations caused in real-time during the consultation videoconference further comprising:
  generating a master video feed by a master camera at the master device; and
  sending, to the client device, the master video feed.

22. The system of claim 12, the operations caused in real-time during the consultation videoconference further comprising:
  determining, by the machine learning model and based on identification of the item, one or more additional items or one or more attributes of the one or more additional items; and
  updating the list based on the one or more additional items or the one or more attributes.

\* \* \* \* \*